United States Patent [19]
Baumann et al.

[11] 3,961,369
[45] June 1, 1976

[54] ROTATING HEAD APPARATUS HAVING A PROTRUDING DIAMETER HEADWHEEL WHICH SUPPORTS A PROTRUDING FLYING HEAD

[75] Inventors: Gerald W. Baumann, Longmont; Harvey R. Fraser, Jr.; Francis E. Hauke, both of Boulder, all of Colo.

[73] Assignee: International Business Machines Corporation, Armonk, N.Y.

[22] Filed: July 15, 1974

[21] Appl. No.: 488,341

[52] U.S. Cl. ............................ 360/84; 360/102
[51] Int. Cl.² .................. G11B 5/60; G11B 21/04; G11B 5/52
[58] Field of Search ................ 360/84, 102, 103

[56] References Cited
UNITED STATES PATENTS

| | | | |
|---|---|---|---|
| 3,078,352 | 2/1963 | Fay | 360/84 |
| 3,139,489 | 6/1964 | Lamb | 360/84 |
| 3,321,585 | 5/1967 | Felix | 360/90 |
| 3,333,753 | 8/1967 | Streets | 360/84 |
| 3,401,236 | 8/1968 | Johnson et al. | 360/107 |
| 3,404,241 | 10/1968 | Maxey et al. | 360/84 |
| 3,422,230 | 1/1969 | Tanigawa et al. | 360/84 |
| 3,504,136 | 3/1970 | Maxey | 360/84 |
| 3,510,604 | 5/1970 | Kell | 360/84 |
| 3,688,285 | 8/1972 | Lawrence et al. | 360/40 |
| 3,821,813 | 6/1974 | Freeman et al. | 360/102 |
| 3,840,894 | 10/1974 | Arseneault | 360/84 |

FOREIGN PATENTS OR APPLICATIONS

| | | | |
|---|---|---|---|
| 960,224 | 6/1964 | United Kingdom | 360/102 |

*Primary Examiner*—Alfred H. Eddleman
*Attorney, Agent, or Firm*—Joscelyn G. Cockburn; Francis A. Sirr

[57] ABSTRACT

A rotating head magnetic tape recording apparatus wherein a helical wrap of magnetic recording tape is formed about a cylindrical mandrel and the headwheel. The headwheel is of a larger radius than the mandrel; thus the headwheel protrudes or penetrates beyond the adjacent mandrel surfaces. This headwheel penetration operates to (1) compensate for mandrel misalignment, if any, and (2) stress the tape in the localized track coincident with the headwheel's path. A magnetic head is mounted on the headwheel to protrude or penetrate radially outward therefrom. The head includes a surface profile causing; th head to fly relative to the tape's recording surface, i.e., a thin air film surrounds the head. The combination of the protruding headwheel and the protruding head produces a stable recording platform at the tape/head interface. The headwheel produces localized tape stress coincident with the headwheel's path. The head produces a moving tent of additional localized tape stress at the tape/head interface.

9 Claims, 10 Drawing Figures

ROTATING HEAD APPARATUS HAVING A PROTRUDING DIAMETER HEADWHEEL WHICH SUPPORTS A PROTRUDING FLYING HEAD

BACKGROUND AND SUMMARY OF THE INVENTION

This invention relates to the field of dynamic magnetic information storage and/or retrieval, and more specifically to a record transport with one or more rotating heads which record and/or reproduce machine-convertible information while moving, i.e., rotating, in transducing relationship with a magnetic web or tape, this information being oriented as magnetic domains to form information tracks which extend generally transverse to the longitudinal tape length.

More specifically, this invention relates to transducing magnetic tape with a rotating magnetic head or transducer wherein a gas bearing is provided to support the tape in a stable manner along the path of a flying head. The stability of the gas bearing adjacent the rotating head is more critical for a flying head than it is for a head which moves in contact with the tape. Any fluttering of the tape due to an unstable gas bearing makes it difficult to control the flying height or separation between a rotating flying head and a magnetic tape.

As used herein, the term "gas bearing" is intended to encompass the use of a compressible fluid, such as air, to support the tape, and to the use of hydrodynamic and/or hydrostatic force in such a gas bearing. As used in the art, the term "hydrostatic" is equivalent to the term "externally-pressurized", and the term "hydrodynamic" is equivalent to the term "self-generated".

Rotating head magnetic tape units are widely known. In one form of prior art device, a tape guiding structure in the form of a generally cylindrical mandrel or drum includes a rotating headwheel which carried one or more read/write heads. The magnetic tape engages the mandrel at one point, makes a helical wrap about at least a portion of the mandrel, and exits the mandrel at a point which is both axially and circumferentially spaced from the entrance point. The angle of helical tape wrap can vary in accordance with design choice, but is usually between 180° and 360°. The headwheel rotates so as to sweep its magnetic head or heads transversely across the tape. The angle at which the head enters and exits the tape may vary, in accordance with design choice, from slightly less than 90° to a small angle, such as 15°.

Another form of prior art device is one wherein the headwheel is associated with a tape guiding structure which bends the tape transversely into an arcuate shape that cconforms to the circumferential shape of the headwheel. In this device the tape travels in a generally straight line past the headwheel, and is transversely bent by the associated guides as it enters the headwheel area.

The present invention finds utility with either aforementioned type of device, and has been found particularly useful with the helical wrap device.

A major problem encountered in the aforementioned devices is that of head/tape wear. Many known devices tolerate high wear conditions in favor of good transducing operation by causing the head to traverse the tape in contact therewith.

In order to reduce wear, numerous solutions have been proposed to provide lubrication as tape passes the rotating head.

For example, it has been proposed that one or both of the mandrel halves rotate to generate an air film. It has also been proposed that one of the mandrel halves rotate in a direction opposite to that of tape motion, and that this rotating mandrel carry a head which protrudes from the periphery, to contact the tape. The rotating mandrel half creates a self-acting or hydrodynamic air bearing. The protruding head mechanically lifts the tape, allowing air to be sucked under the portion of the tape which overlies the stationary mandrel half.

Yet another arrangement suggests that the rotating mandrel half be other than cylindrical, and specifically comprise a cylindrical portion and a frustro-conical portion.

Still other arrangements suggest that the two mandrel halves be rotated in opposite directions.

In yet another arrangement, the mandrel comprises a solid tube which rotates at a high speed in a direction opposite to that of the tape. The mandrel carries a head whose gap extends outwardly beyond the mandrel surface. The thickness of the air layer between the head gap and the tape is reduced by vacuum force, or by an air foil positioned adjacent the head gap. This air foil operates to increase the air velocity therearound, creating a low pressure area which, in turn, results in a reduction in the air pressure between the head gap and the tape.

Another generally different class of rotating head device provides two stationary, but spaced, mandrel halves, with a rotating headwheel located therebetween. In one of these arrangements, each of the mandrel halves includes a thin annular flange, adjacent the headwheel, which flanges extend a distance radially beyond the adjacent mandrel half. These flanges contact the tape and operate to produce localized tensioning in the tape in the vicinity of the head. A head is mounted on the headwheel, and the head physically contacts the tape.

In another arrangement of this type, the peripheral surface of the headwheel is substantially flush, but somewhat recessed, from the adjacent cylindrical surfaces of the two stationary mandrel halves. The rotation of the headwheel causes air to be entrained between the tape and the mandrel halves.

In yet another arrangement, a means is provided for lubricating the engagement of the tape and the rotor heads wherein a generally tapered headwheel carries a number of heads which protrude radially beyond the circumference of the headwheel. The tape/head lubrication is supplied by a volatile lubricant flow or spray which is applied a distance sufficiently far from the tape/head interface so that a portion of the lubricant volatilizes before reaching this interface.

The general concept of providing a stable flying head which is air-bearing separated from adjacent magnetic recording media is of course well known. In one arrangement, a flexible disk rotates relative to a stationary base plate to create a primary air bearing. A stationary head protrudes through this primary air bearing into the rotational plane of the disk. This head penetration creates a secondary air bearing between the head surface and the disk, which secondary air bearing affects a narrow separation between the head and the disk.

The present invention is directed to an improved rotating head device which provides good transducing operation while at the same time reducing head/tape wear by causing the head to fly out of contact with the adjacent tape inteface. The critical features of the present invention are the provision of three different levels of tape tension, these three tape tension levels establishing a stable gas bearing platform to support the tape adjacent the head's transducing gap.

As used herein, the term "flying" or "flying head" is intended to encompass a structure wherein the nominal head-to-tape spacing is in the range of a few microinches, for example, 5 to 20 microinches, and wherein the majority of the force exerted by the head on the tape is a pneumatic force. Occasional contact force, due to the head physically contacting raised portions of the generally rough tape recording surface, is not, however, precluded.

In its more specific aspects, the present invention contemplates a rotating head device wherein two spaced and stationary mandrels of the same diameter or cross-section cooperate with an intermediate headwheel of a larger diameter. This headwheel is preferably crowned or arc-shaped in cross-section, with the major diameter of the arc, measured at its apex, being larger than the adjacent mandrel diameters, and with the minor diameter of the arc, measured adjacent the mandrel, being less than the adjacent mandrel diameters. In this manner, the tape is locally stressed in a track overly the headwheel. The headwheel carries a magnetic recording head which is mounted on the headwheel's major diameter and radially extends therebeyond. The surface of the head is such as to cause the head to fly in microinch adjacency to the tape's magnetic recording surface. The protruding head causes the tape to be locally stressed in a moving tent which overlies the head.

Thus, three significantly different levels of increasing tape stress are provided; namely, in the tape area adjacent the mandrel, in the tape track adjacent the headwheel, and in the moving tape tent adjacent the moving head.

As used herein, the term "arc-shaped" is intended to generically encompass any cross-section which is curved at the rotor edges adjacent the mandrel sections so as to support the adjacent tape on a thin gas bearing. In a preferred embodiment the rotor's edges are recessed below the adjacent surface of the mandrel.

As used herein, the term "head" is intended to encompass one or more magnetic transducing gaps.

RELATED INVENTIONS

U.S. patent application Ser. No. 375,966, filed July 2, 1973, P. J. Arseneault et al., entitled "Improved Tape Transport for Magnetic Recording with a Rotating Head," and commonly assigned, is directed to a preferred arrangement for guiding and air-bearing supporting a length of tape as it extends between a supply spool and a take-up spool, and helically wraps a rotating head mandrel located therebetween.

U.S. patent application Ser. No. 374,089, filed Apr. 2, 1973, by P. J. Arseneault, entitled "Method and Apparatus for Supporting Tape Along a Path of a Rotating Had," now U.S. Pat. No. 3,840,894, and commonly assigned, is directed to a rotating head magnetic tape transport wherein the rotor or headwheel is enlarged in width so that the rotor width is much greater than the tape's data track width or the cooperating head gap. The rotor is mounted in the middle of an air-bearing mandrel about which the tape is helically wrapped. The wide rotor also provides an air bearing for the tape. The wide air-bearing rotor provides a stable air platform upon which the tape rests while it is being scanned by the rotating head.

U.S. patent application Ser. No. 318,973, filed Dec. 27, 1972, by F. R. Freeman et al., entitled "Wasp-Waist Head for Flying Flexible Magnetic Storage Medium Over Head," now U.S. Pat. No. 3,821,813, and commonly assigned, is directed to a rotating head magnetic tape transport wherein the rotor carries a head of a preferred wasp-waist surface configuration to enable the head to fly with a spacing of approximmately 20 to 50 microinches to the tape's recording surface.

U.S. patent application Ser. No. 458,964, filed Apr. 8, 1974, by G. N. Nelson et al., entitled "Rotary Head Assembly Forming Air Bearing with Tape," and commonly assigned, is directed to a rotating head magnetic tape transport wherein the rotor carries a flying head of a preferred two-contour configuration.

U.S. patent application Ser. No. 428,143, filed Dec. 26, 1973, by D. E. Griffiths et al., entitled "Rotating-Head Mandrel with Cam Surface," and commonly assigned, is directed to a mandrel which is contoured in cross-section so as to include an eyeball shaped contour.

The foregoing and other features and advantages of the invention will be apparent from the following more particular description of preferred embodiments of the invention, as illustrated in the accompanying drawing.

DESCRIPTION OF THE PREFERRED EMBODIMENT

Figure 1:
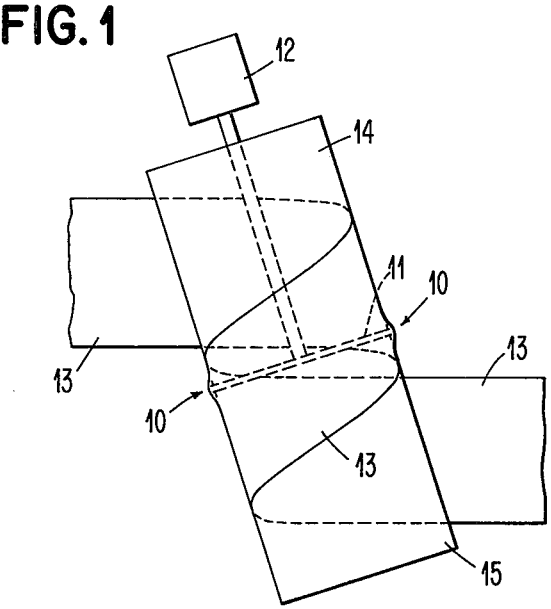
FIG. 1 is a view of a helical tape wrap mandrel/headwheel arrangement embodying the present invention, wherein the protrusion of the headwheel has been dimensionally exaggerated.

FIG. 1 is a simplified view of a helical tape wrap mandrel/headwheel arrangement embodying the present invention. The protrusion 10 produced by the large diameter headwheel 11 has been dimensionally exaggerated. This simplified view does not show the tape supply spool, the take-up spool, nor the necessary arrangements for guiding the helical tape wrap. Reference may be had to the above-mentioned copending application pf P. J. Arseneault et al., entitled "Improved Tape Transport for Magnetic Recording with a Rotating Head," for detailed description of preferred arrangements of this type.

In the arrangement of FIG. 1, headwheel 11 is shaft-connected to motor 12 and is driven at a constant speed thereby. A helical wrap of magnetic recording tape 13 is formed about the generally cylindrical tubular structure formed by stationary mandrel halves 14 and 15. This tape is maintained in tension, for example 0.3 pound per inch, by means not shown. These mandrel halves are closely spaced, in accurate axial alignment, to define an area therebetween which is occupied by headwheel 11. By way of example, mandrel halves 14 and 15 may be constructed as described in the above-mentioned application of D. E. Griffiths et al.

Figure 3:
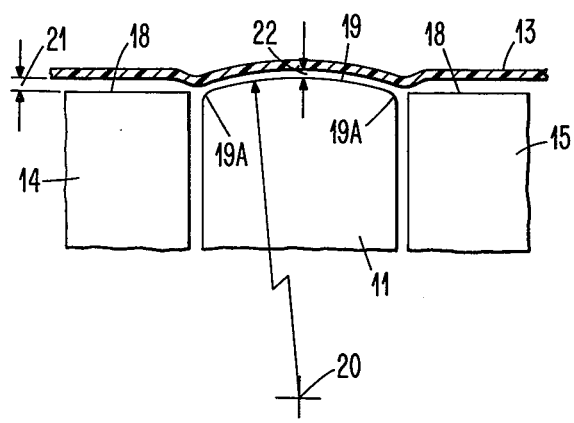
FIG. 3 is a view of a portion of the apparatus of FIG. 2, wherein the headwheel is arc-shaped in cross-section.

In FIG. 3, a portion of the tape is seen in cross-section disposed adjacent mandrel halves 14 and 15. Again, the protrusion of headwheel 11 is exaggerated. By way of example, the diameter 16 of mandrel portions 14 and 15 may be 3.5 inches, whereas the corresponding diameter of headwheel 11 is 3.505 inches. The width 17 of headwheel 11 is, for example, 0.5 inch. In order to create the gas bearing which interfaces headwheel 11 and recording tape 13, a plurality of air holes 9 are machined into the surface of headwheel 11. Pressurized air from a plenum chamber (not shown) supplies air to air holes 9.

Figure 2:
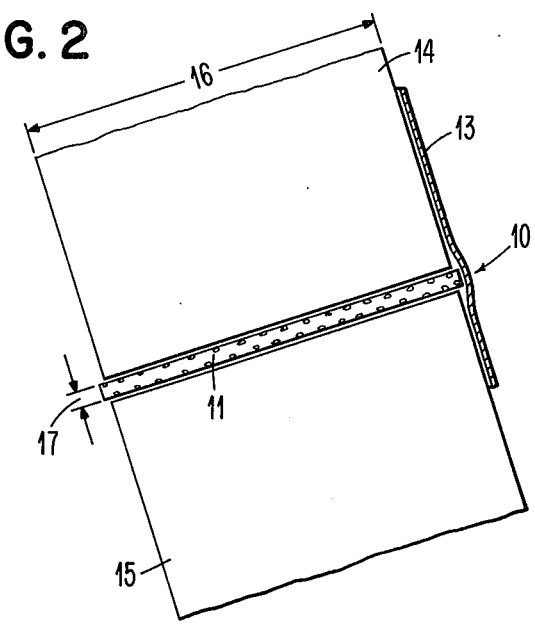
FIG. 2 is a view of a portion of the apparatus of FIG. 1.

FIG. 3 is a view of the tape/headwheel interface portion of the apparatus of FIG. 2, wherein headwheel 11 is arc-shaped in cross-section. As noted from this figure, the surface 18 of mandrel sections 14 and 15 are, ideally, in accurate axial alignment. The arc surface 19 of headwheel 11 is such that the center portion of the arc, by definition its major diameter, protrudes or extends radially beyond surface 18, whereas the two edge portions 19A of the arc, by definition its minor diameter, is of a diameter less than surface 18. For the above example, for a headwheel width of 0.5 inch, the arc formed in the headwheel is a portion of a circle having a radius of approximately 10 inches, generated about point 20. If the major diameter of the headwheel arc is 3.505 inches, as mentioned above, its minor diameter is, for example 3.499 inches. This minor diameter, being less than the 3.5-inch diameter of adjacent mandrel halves 14 and 15, compensates for unintentional mandrel misalignment. An optimum rotor has, for example, been formed so as to penetrate 0.0025 inch above the mandrel, with a 0.003 inch arc, such that is minor diameter is recessed 0.0005 inch below the adjacent mandrel halves.

Figure 3A:
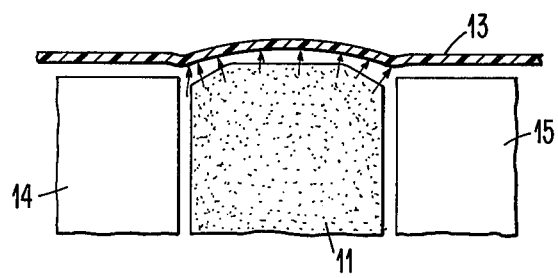
FIG. 3a is a view like FIG. 3 showing another form of the arc-shaped headwheel.
Figure 3B:
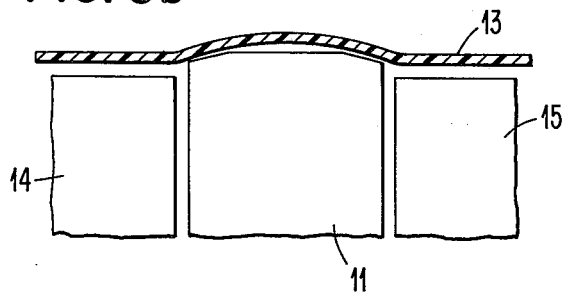
FIG. 3b is a view like FIG. 3 wherein the headwheels's arc-shape includes a minor diameter which is too large.
Figure 3C:
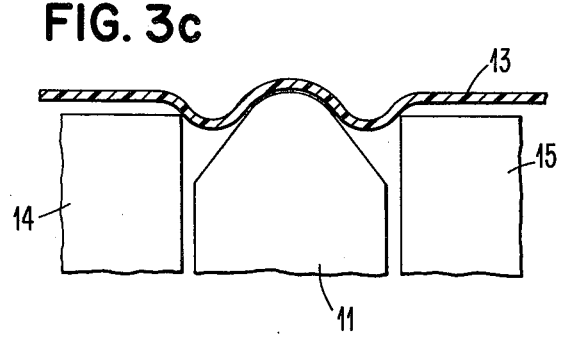
FIG. 3c is a view like FIG. 3 wherein the headwheel's arc-shape includes a minor diameter which is too small.

The headwheels's cross-section is constructed in accordance with the present invention with the following considerations in mind. If the headwheel's minor diameter is too large, as shown in FIG. 3b, not only does one experience tape wear, but a nonstable tape platform is provided for the moving head since the tape flies too high relative to the headwheel. If the headwheel's minor diameter is too small, as shown in FIG. 3c, the tape collapses into the vicinity of the headwheel/mandrel interface, the tape flies too low adjacent the headwheel's major diameter, and the tape is likely to crash into the head and/or headwheel.

Preferably, mandrel sections 14 and 15 are constructed and arranged, by means not shown, to support tape 13 adjacent thereto by a gas bearing. This gas bearing ideally established a tape-to-mandrel separation 21 of approximately 0.002 inch. Whatever the value of the tape-to-mandrel separation 21, this separation establishes the minimum penetration which must be achieved by headwheel 11. Specifically, headwheel 11 must penetrate a distance beyond the tape-to-mandrel separation, so as to additionally stress the tape in the track of the headwheel. The maximum penetration to be achieved by headwheel 11 is determined by consideration of the air bearing between the headwheel and the tape. Too large a penetration requires high airbearing pressure, hydrodynamic and/or hydrostatic, to prevent crashed from occurring between the head and/or the headwheel and tape. In FIG. 3A, the surface of rotor 11 is porous and air is forced from a plenum chamber (not shown) through the porous surface to create the air bearing. Of course, the air bearing may be hydrodynamic instead of hydrostatic.

Headwheel 11 rotates at a relatively high speed, such as, for example, to achieve a surface speed of 1,000 inches per second relative to the tape's oxide surface. This relative headwheel-to-tape motion gives rise to pneumatic hydrodynamic forces. Additionally, within the teachings of the present invention, headwheel 11 may be externally pressurized to define a hydrostatic air bearing adjacent its outer periphery. In either event, an air bearing having a thickness 22 in the range of from 0.0005 to 0.001 inch is established between the annular arc-shaped surface of headwheel 11 and the tape's oxide surface.

As can be appreciated by those of skill in the art, the tension produced in tape 13, immediately adjacent the track of headwheel 11, is higher than the tape tension adjacent mandrel sections 14 and 15. This higher tape tension is evidenced by the much smaller hydrodynamic and/or hydrostatic air bearing achieved in the track of headwheel 11.

Figure 4:
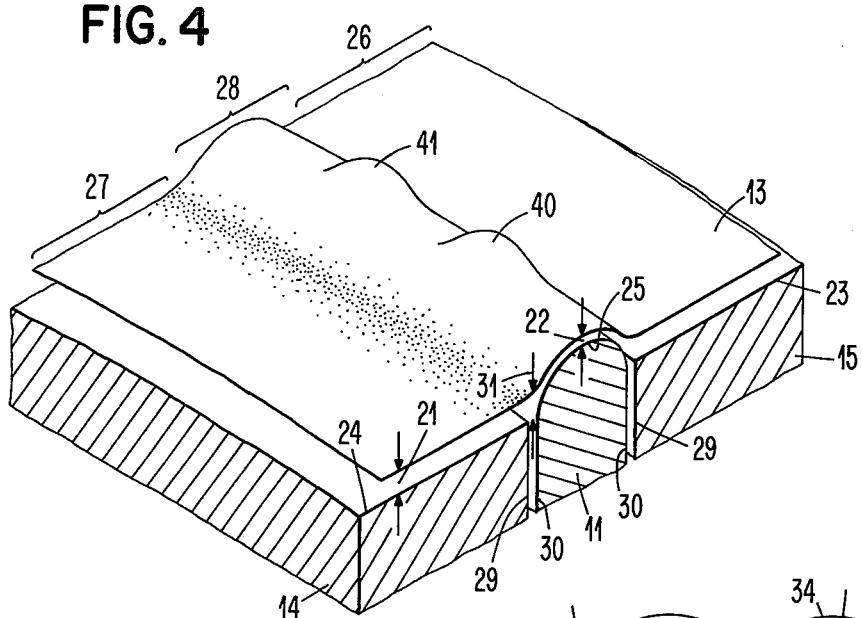
FIG. 4 is a view which shows the three levels of tape stress produced by the present invention. the headwheel carrying two protroding and flying heads.

With reference to FIG. 4, this figure is a view which shows a portion of tape 13 disposed adjacent headwheel 11, much as shown in FIG. 3. In this view, line portions 23 and 24 represent the surface of mandrel sections 15 and 14, respectively. Line portion 25 represents the arc-shaped suface of headwheel 11. Line portions 26 and 27 represent the portion of tape 13 immediately overlying mandrel portions 15 and 14, respectively. Line portions 28 represent the tape as it is locally stressed by protruding headwheel 11. The dimensions in this view are greatly exaggerated and dimensions 21 and 22 have been added to aid in the orientation of this view with that of FIG. 3.

In FIG. 4, lines 29 and 30 have been provided to define the adjacent surfaces of the mandrel sections and the headwheel, respectively. As can be seen from FIG. 4, the air bearing smoothly and uniformly reduces in dimension, beginning at 31, wherein the gas bearing thickness reduces from approximately 0.002 inch until the thin gas bearing at 22 of in the range of 0.0003 to 0.002 inch is established.

Figure 5:
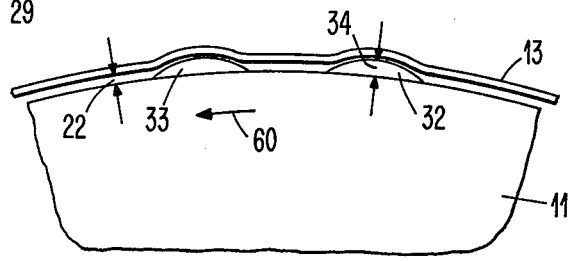
FIG. 5 is an enlarged view of the headwheel of FIG. 3, showing two heads carried thereby.

The headwheel of FIG. 4 carries two protruding heads which are mounted on the major diameter of the crowned headwheel shown in FIG. 3. FIG. 5 shows a portion of such a headwheel which rotates in the direction of arrow 60. Heads 32 and 33 protrude a distance 34 of approximately 0.004 inch beyond the major diameter of headwheel 11. The minimum head penetration is established by the air-bearing thickness established by the headwheel, that is, the head must penetrate a distance greater than the thickness of this air bearing. The maximum penetration is established by the head/tape air-bearing considerations; that is, high air-bearing hydrodynamic force must be generated to prevent head crashes as the head penetration is increased. These two heads, which may comprise read and write heads, respectively, are flying heads. That is, the surface contour of these heads is such as to cause tape 13 to fly in close microinch adjacency to the transducing gaps 64 and 65, FIG. 6, contained within the head profile. The length of gaps 64 and 65 has been exaggerated for clarity. By way of example, the length of the write gap may be 0.015 inch, whereas the corresponding length of read gap 65 may be 0.008 inch. The dimension 62 may be 0.2 inch. By way of example, these heads may be constructed as described in the copending applications of F. R. Freeman et al. or G. N. Nelson et al., above mentioned.

Figure 6:
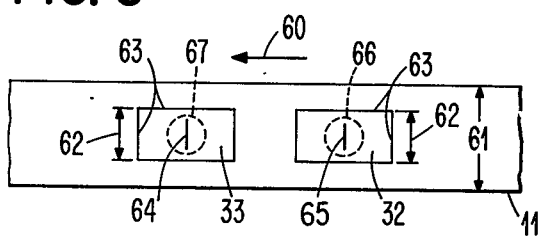
FIG. 6 is a top view of the headwheel of FIG. 5, in the region of the heads.

With reference to FIG. 6, the top view of heads 32 and 33 shows them to be of generally rectangular configuration, identified by the outline 63. The surface 63 of the heads is contiguous with the adjacent mandrel surface, or alternatively is slightly recessed below the mandrel surface. The rotor width 61 is, in its minimum dimension, larger than the headwidth 62, and is preferably two or three times larger than width 62. In FIG. 6, outlined areas 66 and 67 show exemplary areas of microinch flying achieved by the present invention, showing that this area is centered around the head gaps 64 and 65.

With reference to FIG. 4, these two protruding heads produce localized tents of tape deflection, identified as 40 and 41, respectively. The tape-to-head spacing, within these tents, is, for example, from 5 to 20 microinches. In FIG. 5, this very close spacing is shown as substantial contact.

The essence of the present invention is depicted in FIG. 4, wherein the portion of tape 13, adjacent mandrel sections 14 and 15 is supported by a first air bearing, producing localized tape stressing exemplified as 27 and 26, respectively. Adjacent the track of headwheel 11, higher localized tape stress is depicted as 28. Adjacent the two heads 32 and 33, carried by headwheel 11, additional tents of higher tape stress are depicted as 40 and 41, respectively.

The progression of increasing tape stress, namely, in the tape's area adjacent the mandrel (26 and 27), in the tape's track adjacent the headwheel (28) and in the tape's moving tent (40 or 41) adjacent the moving head, insures that the moving tent does not create tape stress waves either ahead of or behind the moving head. Since the position of the tape to be transduced by the heads is referenced to the headwheel, as is the position of the head, a stable tape platform is established, such that the head's transducing gap is maintained in accurate, non-varying, microinch adjacency to the tape's oxide surface, as the head flies relative to the tape.

Figure 7:
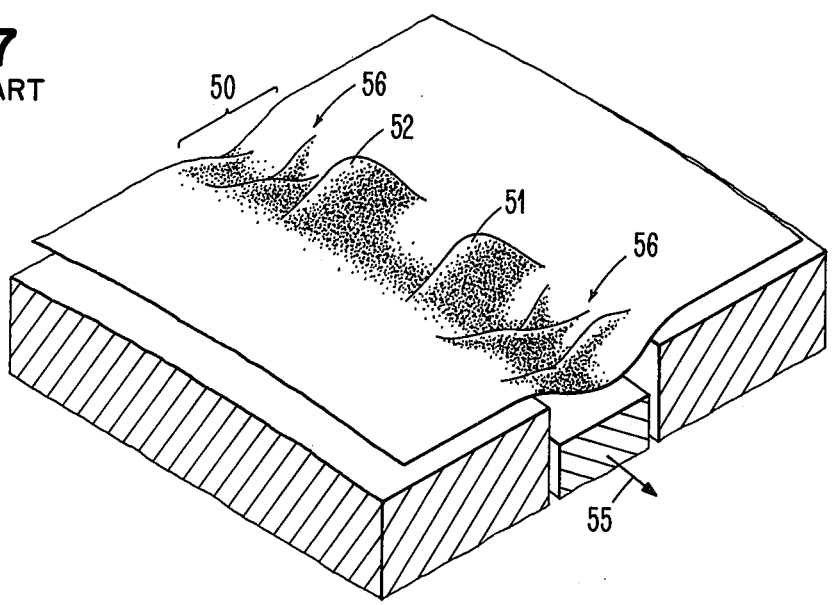
FIG. 7 is a view similar to FIG. 4, showing the tape waves which are produced by typical prior art devices.

The improvement derived from this invention can be appreciated with reference to FIG. 7. This figures is a representation of a prior art rotating head device, wherein the area 50 depicts the headwheel's path. Tents 51 and 52 depict the location of the two heads which protrude above the gas bearing formed by the adjacent mandrel sections. As can be seen from this figures, the heads are assumed to be moving in the direction 55. Since the prior art device does not include the protruding gas bearing headwheel of the present invention, the track of the headwheel, both before and after the heads 51, 52 includes an unstable wave pattern, depicted at 56.

While the invention has been particularly shown and described with reference to a preferred embodiment thereof, it will be understood by those skilled in the art that various changes in form and details may be made therein without departing from the spirit and scope of the invention.

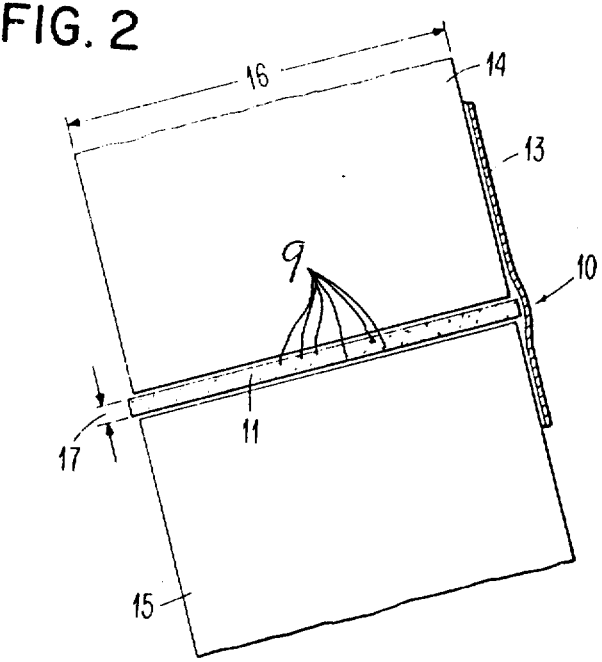

What is claimed is:

1. Apparatus for uniformly supporting magnetic tape along the path of a rotating noncontact head for reading and/or writing information in magnetic domain tracks, said apparatus comprising:
   first and second spaced tape support means cooperating to form a first level of support for supporting the tape;
   a rotor operably mounted intermediate said support means and cooperating to form a second level of support;
   said rotor having an annual surface whose outer diameter extends radially beyond said support means and being operable to support the tape with a gas bearing along the path of said rotor, to thereby produce localized tape deflection coincifent with said path; and
   a noncontact head mounted on said rotor and extending radially beyond the outer diameter thereof, to thereby produce a third level of support and a moving tent of localized tape deflection coincident with said head.

2. The apparatus of claim 1 wherein said first and second tape support means support the tape with a gas bearing.

3. The apparatus of claim 1 wherein the rotor's gas bearing is a hydrodynamic and/or hydrostatic gas bearing.

4. The apparatus of claim 1 wherein said annular surface is arc-shaped in cross-section.

5. The apparatus of claim 4 wherein the edges of said arc are recessed below the surface of the adjacent support means.

6. Apparatus for supporting a length of magnetic recording tape on a gas bearing as it follows a helical path, comprising:
   a pair of generally cylindrical mandrel halves mounted in spaced axial alignment to define a headwheel area therebetween;
   a headwheel mounted to rotate in said headwheel area;
   said headwheel having an annular surface adjacent said tape, the headwheel's diameter being larger than the diameter of said mandrel halves;
   gas-bearing means operable on the periphery of said rotor to produce localized deflection of said tape coincident with the path of said headwheel; and
   a flying head mounted on said headwheel in a manner to protrude beyond said outer arc diameter, said head operating to produce a moving tent of additional localized tape deflection immediately adjacent said head.

7. The apparatus defined in claim 6 wherein the transducing surface of said head is operable to produce a hydrodynamic gas-bearing in the immediate proximity of the transducing gap in said head.

8. The apparatus defined in claim 7, wherein the headwheel is arc-shaped in cross-section; said arc-shaped cross-section having a major diameter and a minor diameter.

9. The apparatus defined in claim 8 wherein said mandrel halves include gas-bearing means opposite on the periphery of said mandrel halves to support the tape in spaced relation to the surface of said mandrel halves.

* * * * *

UNITED STATES PATENT OFFICE
CERTIFICATE OF CORRECTION

PATENT NO. 3,961,369

DATED : June 1, 1976

INVENTOR(S) : Gerald W. Baumann et al.

It is certified that error appears in the above-identified patent and that said Letters Patent are hereby corrected as shown below:

Abstract, line 12, "th" should be --the--.

Column 1, line 56, "cconforms" should be --conforms--.

Column 3, line 30, "overly" should be --overlying--.

Column 5, line 2, "pf" should be --of--.

Column 8, line 16, "annual" should be --annular--.

Column 8, line 20, "coincifent" should be --coincident--.

Column 8, line 29, "1" should be --2--.

Column 8, line 63, "diameter." should read --with said major diameter being longer than the diameter of said mandrel.--.

Column 8, line 65, "opposite" should be --operable--.

Drawing, FIG. 2, should read as shown on the attached sheet.

Signed and Sealed this

Ninth Day of November 1976

[SEAL]

Attest:

RUTH C. MASON
Attesting Officer

C. MARSHALL DANN
Commissioner of Patents and Trademarks